(No Model.)

H. C. ROOT.
COILED WIRE BELT.

No. 266,529. Patented Oct. 24, 1882.

WITNESSES:
H. Turner.
James J. Tobin

INVENTOR:
Howard C. Root
by his attorneys
Housman and Fox

United States Patent Office.

HOWARD C. ROOT, OF PHILADELPHIA, PENNSYLVANIA, ASSIGNOR OF ONE-HALF TO FRANK SHAW, OF BROOKLYN, NEW YORK.

COILED-WIRE BELT.

SPECIFICATION forming part of Letters Patent No. 266,529, dated October 24, 1882.

Application filed July 31, 1882. (No model.)

*To all whom it may concern:*

Be it known that I, HOWARD C. ROOT, a citizen of the United States, and a resident of Philadelphia, Pennsylvania, have invented an Improvement in Coiled-Wire Belts, of which the following is a specification.

The object of my invention is to effect the connection of the ends of a coiled-wire belt without the use of separate connecting-pieces; and this object I attain in the manner which I will now proceed to describe, reference being had to the accompanying drawings, in which—

Figure 1:
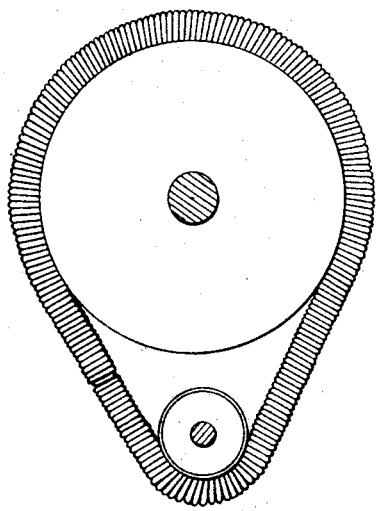
Figure 2:
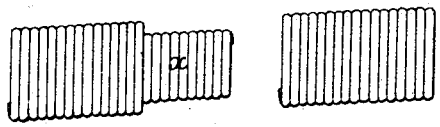

Figure 1 is a view of a pair of pulleys connected by a belt of the character to which my invention relates; Fig. 2, a view of the opposite ends of the belt constructed in accordance with my invention, and Fig. 3 a sectional view of the joint or coupling.

Coiled-wire belts such as shown in Fig. 1 are advisable for many purposes in place of rubber belts or gearing; but difficulty has been experienced in properly connecting the ends of a belt of this class.

Figure 3:
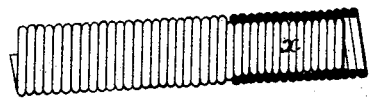

In carrying out my invention I provide a ready means of effecting a firm and elastic connection of the opposite ends of the belt. I make the wire coil of a length somewhat greater than that which is necessary for the belt, the diameter of the coil being reduced at one end of the belt, as shown in Fig. 2, and this reduced portion $x$ being then thrust or screwed into the opposite end of said belt, as shown in Fig. 3. By this means the ends of the belt are caused to take such a firm hold upon each other that the loosening of the belt or the separation of the ends is effectually prevented. A prominent advantage of the connection is that it is flexible, so that it offers no resistance to the curving of the belt, as the latter adapts itself to the pulley.

I am aware that it has been proposed to connect the ends of leather belts by screw-plugs adapted to nuts on the ends of the belt, or by a spring adapted directly to the ends of the belt; but the main feature of my invention is the dispensing with the separate pieces which these methods of connection require, the connection in my improved belt being integral with said belt.

It is advisable in most cases to face one or both of the pulleys with rubber, in order to insure a proper hold of the belt thereon.

I claim as my invention—

A coiled-wire belt having the coils at one end reduced in diameter and introduced into the coils of the opposite end of the belt, as set forth.

In testimony whereof I have signed my name to this specification in the presence of two subscribing witnesses.

HOWARD C. ROOT.

Witnesses:
JAMES F. TOBIN,
HARRY SMITH.